Dec. 14, 1954  M. C. KUEPFER  2,696,810
VALVE SEAT INSERT CONSTRUCTION FOR
INTERNAL-COMBUSTION ENGINES
Filed Aug. 16, 1951                                   2 Sheets-Sheet 1

INVENTOR.
Matthew C. Kuepfer
BY
Freese, Bishop & Hamilton
ATTORNEYS

Dec. 14, 1954  
M. C. KUEPFER  
2,696,810  
VALVE SEAT INSERT CONSTRUCTION FOR
INTERNAL-COMBUSTION ENGINES  
Filed Aug. 16, 1951  
2 Sheets-Sheet 2

INVENTOR.
Matthew C. Kuepfer
BY Frease, Bishop & Hamilton
ATTORNEYS

United States Patent Office 2,696,810
Patented Dec. 14, 1954

2,696,810

VALVE SEAT INSERT CONSTRUCTION FOR INTERNAL-COMBUSTION ENGINES

Matthew C. Kuepfer, Canton, Ohio, assignor to Hercules Motors Corporation, Canton, Ohio, a corporation of Ohio Application August 16, 1951, Serial No. 242,055

7 Claims. (Cl. 123—188)

The invention relates to internal combustion engines and more particularly to a valve seat insert construction for a diesel engine.

There has always been a problem in internal combustion engine construction of how to increase the size of the intake and exhaust valve openings to provide for the largest volume of and free flow of intake and exhaust gases. This problem is particularly acute in the construction of Diesel engines having intake and exhaust valves in the cylinder head thereof.

When it is attempted, for instance, in a diesel engine, to form larger valve openings in the cylinder head, the portion of the cast metal head wall between the valve openings above the central region of the cylinder becomes thinner and thinner; and the internal water cooled cooling surface within the head adjacent this region, in order to maintain the necessary head wall thickness for strength, is spaced further and further away from the thin cast metal head wall portion between the valve openings, thus reducing the cooling effect on the thin walled portion of the head.

Moreover, the temperature of the combustion gases in a Diesel engine is very high and the concentration of heat at certain times during the engine cycle is greatest at the head wall above the central region of the cylinder. This condition results in cracking or failure of the cylinder head casting in the thin walled zone between the valve openings when the valve openings are increased in size.

On the other hand, it is extremely important to increase the size of the valve openings to the greatest possible extent so as to permit the largest possible amount of inlet air to enter the cylinder and pass out the exhaust valve before it closes, during the overlap of the closing and opening position or timing of the exhaust and inlet valves, in order that the scavenging air will reduce the temperature of the exhaust gases to the greatest degree possible to in turn relieve the cylinder, head and piston walls and the exhaust valve of their excess heat.

Attempts have been made to correct these conditions and to partially solve the problem by providing valve seat inserts of heat resisting material which is capable of withstanding high temperatures. However, these prior attempts have involved further difficulties. The use of prior insert arrangements has required the valve openings to be reduced rather than enlarged to accommodate the insert and at the same time to maintain the cast metal head wall between the intake and exhaust valve inserts sufficiently thick and cooled to avoid cracking. Furthermore, it has been extremely difficult to secure such inserts, which have a different coefficient of expansion, in place in the cylinder head. Obviously, if the insert is not properly secured in place, the valve will not properly seat on the valve seat provided by the insert.

I have discovered a solution to this complex problem by providing heat resisting alloy metal valve seat inserts in the cylinder head of a diesel engine with maximum sized openings therein such that the sum of the diameters of the intake and exhaust valve seat openings closely approaches the diameter of the cylinder, and by so forming the valve seat inserts that they not only overlap the cylinder block walls at opposed sides of the cylinder, but also interengage each other above the central region of the cylinder to prevent rotation or turning of the inserts and to cover and protect the cast cylinder head metal in this region from the extremely high combustion flame temperatures.

Accordingly, it is a primary object of the present invention to provide a new valve seat insert construction for a diesel engine which enables maximum sized intake and exhaust valve openings to be provided in the engine cylinder head.

Furthermore, it is an object of the present invention to provide a new valve seat insert construction for a diesel engine in which the inserts are easily and effectively secured in proper fixed position in the engine cylinder head.

Also, it is an object of the present invention to provide a new valve seat insert construction for a diesel engine in which the inserts are formed of heat resisting alloy metal and cover that portion of the cast metal head above the central region of the cylinder so that such cast head wall portion is not exposed directly to the hot combustion flame and the extremely high temperature thereof.

Moreover, it is an object of the present invention generally to improve the construction of the cylinder head and valve openings of a diesel engine to avoid the possibility of cracking the cast metal walls of the cylinder head and to provide for the passage of a maximum amount of scavenging air during the overlap of the closing and opening positions of the exhaust and inlet valves in order to provide the maximum cooling effect thereby.

Finally, it is an object of the present invention generally to improve the construction of cast iron, water-jacketed cylinder heads for diesel engines and particularly of the inlet and exhaust valve openings therein.

These and other objects and advantages may be obtained, the described difficulties overcome, the complex problem solved, and many new results achieved, by the devices, arrangements, constructions, combinations, elements, parts and valve seat and cylinder head structures which comprise the present invention, the nature of which is set forth in the following general statement, a preferred embodiment of which—illustrative of the best mode in which applicant has contemplated applying the principles—is set forth in the following description, and which are particularly and distinctly pointed out and set forth in the appended claims forming part hereof.

The nature of the improvements of the present invention may be stated in general terms as including in a diesel engine, a cylinder block, a cast iron, water-jacketed cylinder head, walls forming exhaust and inlet valve openings in the head, shouldered side communicating recesses formed in said head around said openings, flanged valve inserts of heat resisting alloy material in said shouldered recesses, the flanges of said inserts overlapping the cylinder block walls at opposite sides of the cylinder, and the flange of each insert in the zone above the central region of the cylinder having a surface abutting a similar complementary surface on the other insert so that the insert metal covers the cast head metal at said zone to protect it from direct exposure to the hot combustion gas flame.

By way of example, a preferred embodiment of the improved construction is illustrated in the accompanying drawings forming a part hereof, wherein.

Figure 1:
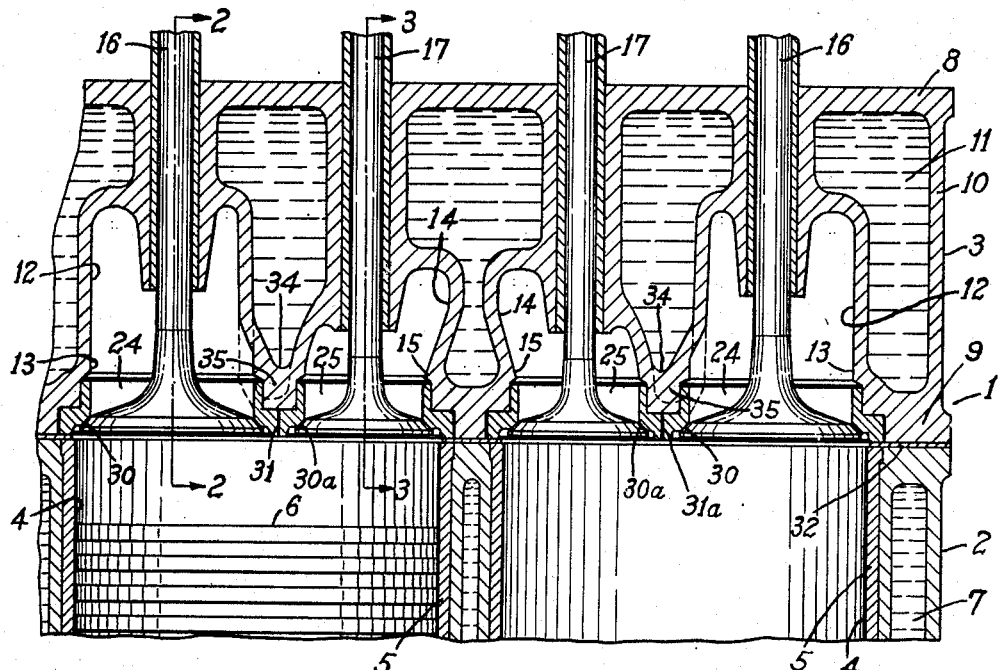
Figure 1 is a fragmentary longitudinal sectional view through the upper portion of a cylinder block of a diesel engine in which the improved valve seat insert construction is incorporated.
Figures 2, 3:
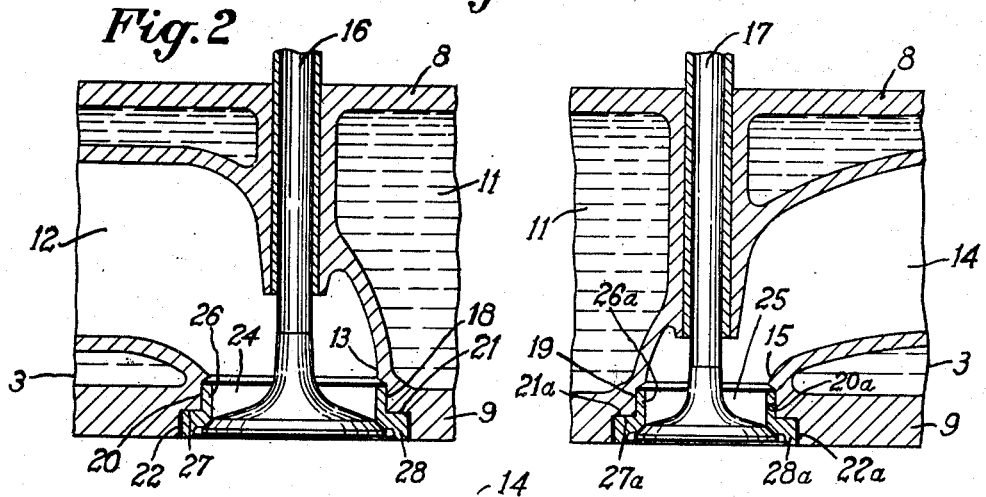
Fig. 2 is a section through the intake valve taken on the line 2—2, Fig. 1.
Fig. 3 is a similar section through the exhaust valve taken on the line 3—3, Fig. 1.
Figure 6:
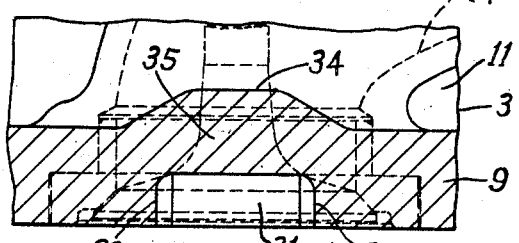
Figure 4:
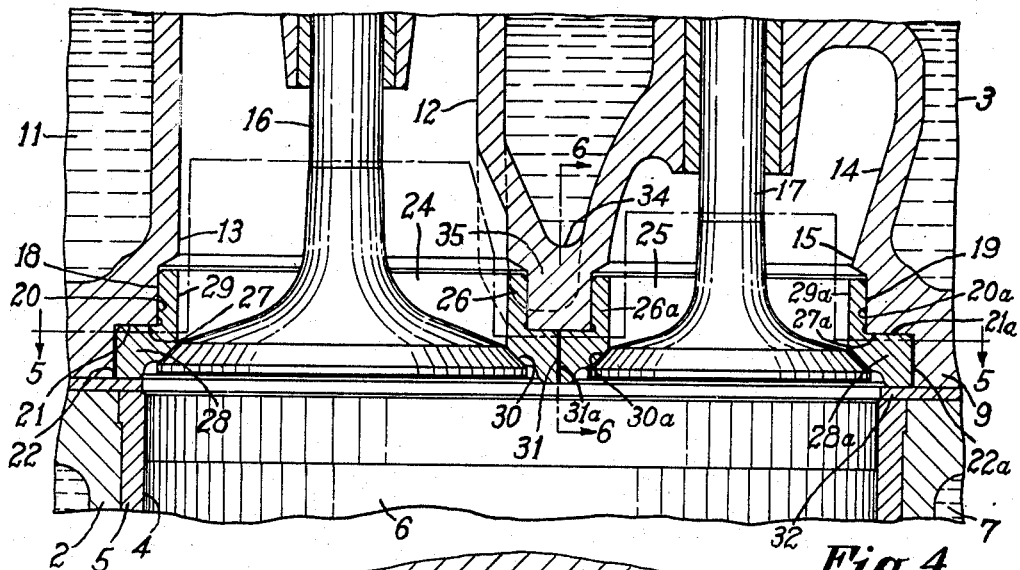
Fig. 4 is an enlarged view of a portion of Fig. 1.
Figure 5:
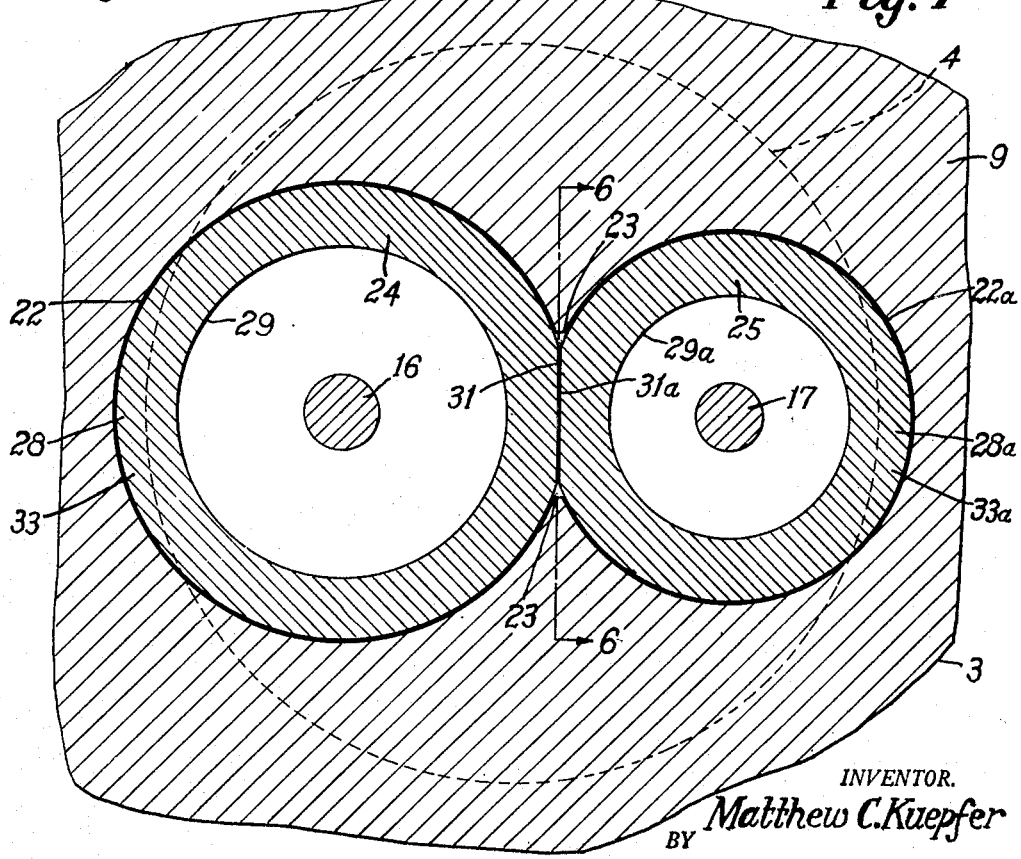

Fig. 5 is a fragmentary plan sectional view taken on the line 5—5 of Fig. 4; and Fig. 6 is a fragmentary sectional view looking in the direction of the arrows 6—6, Figs. 4 and 5.

Similar numerals refer to similar parts throughout the various figures of the drawings.

A diesel engine provided with the improved valve seat insert construction is generally indicated at 1 and includes, in combination with the usual parts of an internal combustion engine, a cylinder block 2 and a cylinder head 3 mounted at the upper end thereof.

The cylinder block 2 includes walls forming a plurality of cylinders 4 preferably provided with cylinder liners 5 in each of which a piston 6 is operatively mounted; and the cylinder block 2 may be provided with usual water passages 7 for cooling the same.

The cylinder head 3 is formed with spaced upper and lower walls 8 and 9 which together with usual side and end walls 10 provide enclosed water cooled passages 11. The cylinder head 3 is formed above each cylinder with an intake passage 12 leading from an intake valve opening generally indicated at 13 and leading to an intake manifold, not shown; and also with an exhaust passage 14 leading from an exhaust valve opening generally indicated at 15 and to an exhaust manifold, not shown. The intake and exhaust valve openings 13 and 15 have usual intake and exhaust valves 16 and 17 operatively associated therewith.

In accordance with the present invention, the cylinder head 3 which is normally formed as a casting, usually cast iron, is provided with shouldered annular recesses 18 and 19 in the cylinder head bottom wall 9 surrounding the intake and exhaust openings 13 and 15, respectively. These shouldered recesses 18 and 19 each have cylindrical portions 20 and 20a slightly larger than the openings 13 and 15, respectively, flat annular shoulder surfaces 21 and 21a formed parallel with the bottom face of the cylinder head bottom wall 9, and enlarged cylindrical portions 22 and 22a extending from the shoulder surfaces 21 and 21a to the bottom surface of the cylinder head 9. Referring particularly to Fig. 5, the enlarged cylindrical recess portions 22 and 22a have side communication with each other and are spaced on centers such that complete circles are not formed but the cylindrical walls 22 and 22a merge at points or elements 23 near the portion of the cylinder head wall 9 above the central region of the cylinder 4. Likewise, the cylindrical recess walls 22 and 22a overlap the cylinder block walls and cylinder liners 5 at opposite sides of the cylinder 4, as well shown in Figs. 4 and 5.

Valve seat inserts 24 and 25 are assembled in the cylinder head 3 in the shouldered recesses 18 and 19. In accordance with the present invention, the valve seat inserts 24 and 25 are formed of heat resisting material and each comprise a cylindrical sleeve portion 26 and 26a seated with a press fit within the cylindrical recess walls 20 and 20a, respectively. Each insert 24 and 25 also has a shoulder 27 and 27a seated on the recess shoulder wall 21 and 21a and the inserts have enlarged cylindrically formed heads or flanges 28 and 28a which fit with a slight clearance within the recess side communicating walls 22 and 22a, respectively.

The valve seat inserts 24 and 25 are each formed with openings 29 and 29a communicating with the intake and exhaust valve openings 13 and 15 in the cylinder head 3, and which terminate in the usual recessed valve seats 30 and 30a, against which the valves 16 and 17 seat in the usual manner.

Referring particularly to Fig. 5, the enlarged cylindrically formed insert heads 28 and 28a are formed with flattened or complementary surfaces 31 and 31a which meet and are in substantial abutment with slight clearance above the central region of the cylinder 4 between the points or elements 23 bounding the side communication between the recess walls 22 and 22a.

Because of the particular construction, arrangement and assembly of the inserts 24 and 25, the press fit of the sleeve portions 26 and 26a thereof in recess portions 20 and 20a and the engaged flattened surfaces 31 and 31a, the inserts are secured tightly in the cylinder head and are prevented from rotative movement which might be induced either by engine vibration or movement of the valves 16 and 17.

In assembling the inserts in the cylinder head, after the same are seated, the bottom surfaces thereof are ground flush with the bottom surface of the cylinder head so that when the cylinder head 3 is tightened on the cylinder block 2 against the usual gasket 32, the inserts 24 and 25 are securely clamped in the shouldered recesses 18 and 19. The overlap of the enlarged insert head portions 28 and 28a over the cylinder block walls on opposite sides of the cylinder 4, as indicated at 33 and 33a in Fig. 5, prevents the inserts from dropping out of the shouldered recesses in the event that differences in expansion of the dissimilar metals from which the inserts and cylinder head are formed should cause the press fit therebetween to become loosened momentarily by reason of temperature changes incident to the operation of the engine.

Referring particularly to Figs. 4, 5 and 6, it is noted that the water cooling chamber for cooling the cylinder head portion between the inlet and exhaust passages 12 and 14 is raised as indicated at 34 in order to maintain proper wall thickness and to avoid sharp crevices. This arrangement is required because of the thinness of the cylinder head wall at this portion caused by increasing the diameters of the intake and outlet openings 13 and 15 and results in a decreased water cooled cooling effect to the wall portion 35 which is immediately above the hottest zone in the cylinder at certain times in the cycle. However, because of the particular construction and arrangement of the valve inserts 24 and 25 adjacent the flat portions 31 and 31a thereof which flank and cover the cast metal cylinder head wall portion 35, this wall portion where the thinnest and where cracking has developed in prior constructions is protected and covered by the insert flanges 28 and 28a so that the cast metal of the cylinder head above the central region of the cylinder is protected from and is not exposed to the hot combustion gas flame.

By these means, the improved valve seat insert construction of the present invention protects the thin walled cylinder head portion between inlet and exhaust openings from direct impingement by the hot combustion gas flames and at the same time maximum sized inlet and exhaust openings are provided enabling a maximum amount of scavenging air to pass from intake to exhaust valves during the engine overlap for attaining maximum cooling of the exhaust gases.

At the same time, the particular valve seat insert construction which obtains the stated advantages also provides for securely holding the inserts in proper position in the cylinder head at all times regardless of expansion and contraction and differentials thereof incident to temperature changes and the different materials from which the cylinder head and inserts are formed.

Accordingly, the present invention provides an improved cylinder head and valve seat construction for diesel engines in which a cast iron, water-jacketed cylinder head is used and cracking of the cylinder head walls is avoided at thin wall portions thereof resulting from increasing the size of the intake and exhaust valve openings; and provides a new construction eliminating the difficulties involved in prior construction, solving the complex problem existing in the art, and obtaining the new results set forth in a simple and effective manner.

The embodiment of the present invention illustrated and described herein is by way of example, and the scope of the invention is not limited to the exact details of construction of the various parts illustrated.

Finally, in the foregoing description, certain terms have been used for brevity, clearness and understanding; but no unnecessary limitations are to be implied therefrom beyond the requirements of the prior art, because such words are used for descriptive purposes herein and not for the purpose of limitation, and are intended to be broadly construed.

Having now described the features of the invention, the construction and assembly of a preferred embodiment thereof, and the advantageous, new and useful results obtained by the improved valve seat insert construction; the new and useful devices, arrangements, constructions, combinations, elements and parts and reasonable mechanical equivalents thereof, obvious to those skilled in the art, are set forth in the appended claims.

I claim:

1. In an internal combustion engine having a cylinder block and a cylinder head, walls forming intake and exhaust valve openings in the head, a shouldered recess formed in said head around each opening, the recesses communicating with each other, a flanged valve seat insert ring in each shouldered recess, the insert flanges overlapping the cylinder block walls at opposite sides of the cylinder, and the flange of each insert in the zone above the central region of the cylinder having a surface portion abutting a complementary surface portion on the other insert.

2. In an internal combustion engine having a cylinder block formed with cylinders therein and a cast iron water-jacketed cylinder head, walls forming intake and exhaust valve openings in the head the sum of the diameters of which closely approximate the diameter of a cylinder served thereby, a flanged valve seat insert ring formed of heat resisting material seated in each valve opening, the insert flanges overlapping the cylinder block walls at opposite sides of the cylinder, and the flange of each insert in the zone above the central region of the cylinder having a flat side surface abutting a similar flat side surface on the other insert.

3. In an internal combustion engine having a cylinder block and a cylinder head, walls forming intake and exhaust valve openings in the head, there being a shouldered annular recess formed in each head around each opening; said recess including a sleeve receiving portion, a flat shoulder portion located in a plane parallel with the bottom surface of the cylinder head, and an enlarged curved portion; the enlarged curved portions of the intake and exhaust valve opening recesses for any cylinder intersecting at spaced points above the central region of such cylinder; a flanged valve seat insert ring having a sleeve portion seated in the sleeve receiving portion of each recess; and the flange of each insert in the zone above the central region of the cylinder being adjacent the other insert flange between said spaced points thereby covering the cylinder head wall at said region between said spaced points.

4. The construction set forth in claim 3 in which the flange of each insert also overlaps a portion of the cylinder block wall of the cylinder served thereby.

5. The construction set forth in claim 3 in which the flange of each insert seats on the flat shouldered portion of the recess in which it is received, and in which the flat shouldered portions of the intake and exhaust valve openings lie in the same plane.

6. The construction set forth in claim 3 in which the adjacent flanges have flat opposite side faces between said spaced points.

7. The construction set forth in claim 3 in which the sleeve of each insert ring has a press fit in its recess sleeve receiving portion.

References Cited in the file of this patent

UNITED STATES PATENTS

| Number | Name | Date |
|---|---|---|
| 1,756,337 | Bowler | Apr. 27, 1930 |
| 2,085,810 | Ljungstrom | July 6, 1937 |
| 2,270,990 | Bachle | Jan. 27, 1942 |
| 2,517,114 | Karcher et al. | Aug. 1, 1950 |

FOREIGN PATENTS

| Number | Country | Date |
|---|---|---|
| 807,344 | France | Jan. 9, 1937 |